US008580010B2

(12) United States Patent
Matsuba et al.

(10) Patent No.: US 8,580,010 B2
(45) Date of Patent: Nov. 12, 2013

(54) DESICCANT AIR-CONDITIONING SYSTEM AND OPERATING METHOD THEREOF

(75) Inventors: Tadahiko Matsuba, Tokyo (JP);
Naofumi Ushioda, Tokyo (JP);
Yoshitaka Takakura, Tokyo (JP)

(73) Assignee: Azbil Corporation, Tokyo (JP)

( * ) Notice: Subject to any disclaimer, the term of this patent is extended or adjusted under 35 U.S.C. 154(b) by 124 days.

(21) Appl. No.: 13/305,900

(22) Filed: Nov. 29, 2011

(65) Prior Publication Data

US 2012/0132070 A1 May 31, 2012

(30) Foreign Application Priority Data

Nov. 29, 2010 (JP) ................................. 2010-264856

(51) Int. Cl.
*B01D 53/06* (2006.01)
*F24F 3/14* (2006.01)

(52) U.S. Cl.
USPC ........ 95/10; 95/113; 95/118; 95/120; 95/111; 95/125; 95/127; 62/94

(58) Field of Classification Search
USPC ........ 95/1, 8, 10, 113, 117, 118–121; 96/111, 96/125–127; 62/271, 94
See application file for complete search history.

(56) References Cited

U.S. PATENT DOCUMENTS

| | | | | |
|---|---|---|---|---|
| 4,926,618 A | * | 5/1990 | Ratliff | 95/10 |
| 6,050,100 A | * | 4/2000 | Belding et al. | 62/271 |
| 7,437,884 B2 | * | 10/2008 | Otake et al. | 62/271 |
| 8,328,904 B2 | * | 12/2012 | Griffiths et al. | 95/10 |
| 8,372,180 B2 | * | 2/2013 | Akkerman et al. | 95/10 |
| 2011/0239867 A1 | * | 10/2011 | Matsuba et al. | 96/143 |

FOREIGN PATENT DOCUMENTS

| | | |
|---|---|---|
| JP | 2001-241693 A | 9/2001 |
| JP | 2003-262376 A | 9/2003 |
| JP | 2006-308229 A | 11/2006 |

* cited by examiner

*Primary Examiner* — Frank Lawrence, Jr.
(74) *Attorney, Agent, or Firm* — Troutman Sanders LLP

(57) ABSTRACT

A dew point temperature sensor detects and sends the dew point temperature of the supply air to a dry area, as a supply air dew point temperature, to a controller. The controller has a speed of rotation of the regenerating side fan (the regenerating air flow rate) to control, and determines a control value (the regenerating air flow rate) that causes the supply air dew point temperature to go to a target dew point temperature, and determines a supply air processing pre-cooling coil exit temperature setting value in accordance with this control value (where if the control value is in the direction of reducing the regenerating air flow rate, the supply air processing pre-cooling coil exit temperature setting value is increased). Note that what is controlled is the speed of rotation of the desiccant rotors, or the exit temperatures of the air heated by the hot water coils.

4 Claims, 14 Drawing Sheets

| Dew Point Temperature | Dry Bulb Temperature | Relative Humidity |
|---|---|---|
| -10°C DP | 10°C | 10.7% |
|  | 15°C | 14.7% |
|  | 20°C | 20.4% |
| -15°C DP | 10°C | 4.4% |
|  | 15°C | 6.05% |
|  | 20°C | 8.4% |
| -20°C DP | 10°C | 1.62% |
|  | 15°C | 2.23% |
|  | 20°C | 3.11% |

DESICCANT AIR-CONDITIONING SYSTEM AND OPERATING METHOD THEREOF

CROSS REFERENCE TO RELATED APPLICATIONS

The present application claims priority under 35 U.S.C. §119 to Japanese Patent Application No. 2010-264856, filed Nov. 29, 2010, which is incorporated herein by reference.

FIELD OF TECHNOLOGY

The present invention relates to a desiccant air-conditioning system and operating method thereof, using a desiccant rotor that continuously performs adsorption of moisture from air of a processing side and desorption of moisture to air on a regenerating side, while rotating, disposed bridging a flow path of the air on the regenerating side and a flow path of the air on the processing side.

BACKGROUND

Conventionally desiccant air-conditioning systems that use desiccant rotors have been used as air conditioners for maintaining low humidity levels in cold storage warehouses, battery factories, and the like (See, for example, Japanese Unexamined Patent Application Publication 2006-308229 and Japanese Unexamined Patent Application Publication 2001-241693).

A desiccant rotor has a structure that is formed into a disk shape such that air can pass through in the direction of thickness thereof. A solid adsorbent material that has a porous inorganic compound as its primary constituent is provided on the surface of the desiccant rotor. A solid adhesive agent such as, for example, a silica gel, zeolite, a polymer adhesive agent, or the like, that is able to adsorb moisture, with pore diameters between about 0.1 and 20 nm, is used as the porous inorganic compound. Moreover, the desiccant rotor is driven by a motor, to rotate around a central axis, to continuously adsorb moisture from the air on the processing side and desorb moisture to the air on the regenerating side.

FIG. 17 shows a schematic of a conventional desiccant air-conditioning system that uses a desiccant rotor. In the figure, 100 is an air-conditioning device (a desiccant air conditioner) that generates air of a constant temperature with low humidity, and 200 is a dry area (an air-conditioned space) that receives the supply of constant-temperature/low-humidity air from the desiccant air conditioner 100. The desiccant air conditioner 100 is structured with a rotary moisture removing device 100A, as a moisture removing mechanism, and an air temperature adjusting device 100B, for adjusting the temperature of the air from which the moisture has been removed by the rotary moisture removing device 100A, disposed in a line.

The rotary moisture removing device 100A has a regenerating side fan 1 for producing an airflow on the regenerating side; a processing side fan 2 for producing an airflow on the processing side; a first desiccant rotor (a desiccant rotor for processing outside air) 3 that is disposed bridging the downstream side of a flow path L1 for the air on the regenerating side and the upstream side of a flow path L2 for the air on the processing side; a second desiccant rotor (a desiccant rotor for processing supply air) 4 that is disposed bridging the upstream side of the flow path L1 for the air on the regenerating side and the downstream side of the flow path L2 for the air on the processing side; a first cold water coil (a pre-cooling coil for processing the outside air) 5 for cooling the air on the processing side prior to moisture adsorption by the desiccant rotor 3 for processing the outside air; a second cold water coil (a pre-cooling coil for processing the supply air) 6 for cooling the air prior to adsorption of moisture by the desiccant rotor 4 for processing the supply air; a first hot water coil 7 for heating the air on the regenerating side prior to moisture desorption by the desiccant rotor 3 for processing the outside air; and a second hot water coil 7 for heating the air on the regenerating side prior to moisture desorption by the desiccant rotor 4 for processing the supply air. The air temperature adjusting device 100B comprises a cold water coil 9 and a hot water coil 10. The cold water coil 9 and the hot water coil 10 are disposed lined up in the flow path L2 for the air on the processing side that is sent from the rotary moisture removing device 100A to the dry area 200.

Note that M1 is a motor for rotating the desiccant rotor 3 for processing the outside air; M2 is a motor for rotating the desiccant rotor 4 for processing the supply air; S1 is a temperature sensor for measuring the exit temperature of the air that is cooled by the pre-cooling coil 5 for processing the outside air as the pre-cooling coil exit temperature $ts1pv$ for processing the outside air; S2 is a temperature sensor for measuring the exit temperature of the air that is cooled by the pre-cooling coil 6 for processing the supply air, as the pre-cooling coil exit temperature $ts2pv$ for processing the supply air; S3 is a temperature sensor for measuring the exit temperature of the air that is heated by the first hot water coil 7 as the hot water coil exit temperature $tr1pv$; S4 is a temperature sensor for measuring the exit temperature of the air that is heated by the second hot water coil 8, as the hot water coil exit temperature $tr2pv$; and S5 is a temperature sensor for measuring the temperature of the air (supply air) SA from the air temperature adjusting device 100B to the dry area 200, as the supply air temperature tspv.

The pre-cooling coil 5 for processing the outside air, in the rotary moisture removing device 100A, is provided with cold water CW through a cold water valve 11, and the pre-cooling coil 6 for processing the supply air is provided with cold water CW through a cold water valve 12. Moreover, a controller 13 is provided for the pre-cooling coil 5 for processing the outside air, and a controller 14 is provided for the pre-cooling coil 6 for processing the supply air. The controller 13 controls the degree of opening of the cold water valve 11 so that the pre-cooling coil exit temperature $ts1pv$ for processing the outside air, measured by the temperature sensor S1, will go to a setting temperature (a pre-cooling coil exit temperature setting value for processing the outside air) $ts1sp$. The controller 14 controls the degree of opening of the cold water valve 12 so that the pre-cooling coil exit temperature $ts2pv$ for processing the supply air, measured by the temperature sensor S2, will go to a setting temperature (a pre-cooling coil exit temperature setting value for processing the supply air) $ts2sp$.

The first hot water coil 7 of the rotary moisture removing device 100A is supplied with hot water HW through a hot water valve 15, and the second hot water coil 8 is supplied with hot water HW through a hot water valve 16. Moreover, a controller 17 is provided for first hot water coil 7, and a controller 18 is provided for the second hot water coil 8. The controller 17 controls the degree of opening of the hot water valve 15 so that the hot water coil exit temperature $tr1pv$, measured by the temperature sensor S3, will go to a setting temperature (hot water coil exit temperature setting value) $tr1sp$. The controller 18 controls the degree of opening of the hot water valve 16 so that the hot water coil exit temperature $tr2pv$, measured by the temperature sensor S4, will go to a setting temperature (hot water coil exit temperature setting value) $tr2sp$.

The cold water coil 9, in the air temperature adjusting device 100B, is provided with cold water CW through a cold water valve 19, and the hot water coil 10 is provided with hot water HW through a hot water valve 20. A controller 21 is provided for the cold water coil 9 and the hot water coil 10. The controller 21 controls the degree of opening of the cold water valve 19 and the hot water valve 20 so that the supply air temperature tspv, measured by the temperature sensor S5, will go to a setting temperature (a supply air temperature setting value) tssp.

In this desiccant air conditioning system, the outside air OA that is drawn in as air prior to processing is cooled, by the pre-cooling coil 5 for processing the outside air, to produce air at the setting temperature ts1$sp$, which is sent to the desiccant rotor 3 for processing the outside air. When this air passes through the desiccant rotor 3 for processing the outside air, moisture that is included in this air is adsorbed (moisture adsorption) by the solid adsorbing agent of the desiccant rotor 3 for processing the outside air. Given this, the air, after moisture adsorption by the desiccant rotor 3 for processing the outside air, is cooled again by the pre-cooling coil 6 for processing the supply air, to produce air of the setting temperature ts2$sp$, which is sent to the desiccant rotor 4 for processing of the supply air. When this air passes through the desiccant rotor 4 for processing the supply air, moisture that is included in this air is adsorbed (moisture adsorption) by the solid adsorbing agent of the desiccant rotor 4 for processing the supply air. Given this, the air after moisture adsorption by the desiccant rotor 4 for processing the supply air, that is, the air from which moisture has been removed by the rotary moisture removing device 100A, is sent to the air temperature adjusting device 100B, where the temperature is adjusted to produce supply air SA of the setting temperature tssp, which is supplied to the dry area 200.

On the other hand, on the regenerating side, outside air OA, as air on the regenerating side, is drawn in and sent to the hot water coil 8, and heated. This causes the temperature of the outside air OA to increase to the setting temperature tr2$sp$, reducing the relative humidity. At this time, the outside air OA is brought to a high temperature, in excess of 100° C. Given this, the outside air OA that is at the high temperature, wherein the relative humidity has been reduced, is sent, as air for regenerating, to the desiccant rotor 4 for processing the supply air.

The desiccant rotor 4 for processing the supply air rotates, so that the solid adsorbing agent that adsorbs the water content from the air on the processing side is heated when it faces the air for regenerating. Doing so causes the water content to be desorbed from the solid adsorbing agent, desorbing the moisture into the air for regenerating. The air for regenerating that has absorbed the water content from the solid adsorbing agent is again heated by the hot water coil 7 to become air at the setting temperature tr1$sp$, and is sent, as air for regenerating, to the desiccant rotor 3 for processing the outside air.

The desiccant rotor 3 for processing the outside air rotates, so that the solid adsorbing agent that adsorbs the water content from the air on the processing side is heated when it faces the air for regenerating. Doing so causes the water content to be desorbed from the solid adsorbing agent, desorbing the moisture into the air for regenerating. The air for regenerating that has absorbed the water content from the solid adsorbing agent is exhausted as exhaust air EA.

In this way, in the desiccant air conditioning system illustrated in FIG. 17, while the desiccant rotors 3 and 4 are rotated at a constant rotational speed and the speeds of rotation of the regenerating side fan 1 and the processing side fan 2 are held constant (the rated rotational speeds), the pre-cooling coil exit temperature setting value ts1$sp$ for processing the outside air, the pre-cooling coil exit temperature setting value ts2$sp$ for processing the supply air, the hot water coil exit temperature setting value tr1$sp$, and the hot water coil exit temperature setting value tr2$sp$ are each held constant, and the adsorption of moisture from the air on the processing side and the desorption of moisture to the air on the regenerating side are performed continuously in the desiccant rotors 3 and 4, to continuously provide supply air SA (constant-temperature/low-humidity air) SA from the desiccant air conditioner 100 to the dry area 200.

However, in the desiccant air conditioning system set forth above, the volumes of the air to the regenerating side of the desiccant rotors 3 and 4 are set so as to be constant, based on the peak times for the amount of moisture adsorption on the processing side of the desiccant rotors 3 and 4, so as to be able to desorb the water content that is adsorbed at the peak times, and thus the energy consumption in the hot water coils 7 and 8 is terrible, and the operating costs are large.

That is, when the amount of water content included in the air on the processing side, drawn into the rotary moisture removing device 100A, is small, the amount of moisture that is adsorbed onto the solid adsorbing agents of the desiccant rotors 3 and 4 is small. Consequently, the water content that is desorbed from the solid adsorbing agent of the desiccant rotors 3 and 4 is small on the regenerating side as well. Nevertheless, the amount of air on the regenerating side that is supplied to the desiccant rotors 3 and 4 is a constant amount of air based on the peak times for the amount of moisture adsorption on the processing side. Because of this, the amount of air for regeneration that is supplied to the desiccant rotors 3 and 4 is greater than necessary, and, to that extent, energy is consumed wastefully in the hot water coils 7 and 8.

Given this, the present applicant conceived of adding an inverter INV1 to the regenerating side fan 1, as illustrated in FIG. 18, and detecting the dew point temperature of the supply air SA to the dry area 200 through a dew point temperature sensor 22, to apply, to a controlling device 23, the dew point temperature (the supply dew point temperature) tdpv of the supply air SA that is detected by the dew point temperature sensor 22, to control the rotational speed of the regenerating side fan 1 so that the supply air dew point temperature tdpv will be caused, by the controlling device 23, to go to a target dew point temperature tdsp. Doing this causes the amount of air for regeneration that is supplied to the desiccant rotors 3 and 4 (the regenerating air flow rate) to be adjusted so that the supply air dew point temperature tdpv will always be the target dew point temperature tdsp, making it possible to reduce the amount of energy consumed in the hot water coils 7 and 8.

For example, if the supply air dew point temperature tdpv were less than the target dew point temperature tdsp, then the rotational speed of the regenerating side fan 1 would be reduced, to reduce the regenerating air flow rate. When the regenerating air flow rate is reduced, then the temperatures of the regenerating air from the hot water coils 7 and 8 increase. In this case, control is performed so as to maintain the temperatures of the regenerating air at the setting temperatures tr1$sp$ and tr2$sp$, and thus the amount of hot water HW supplied to the hot water coils 7 and 8 would be reduced, reducing the energy consumed by the hot water coils 7 and 8.

Note that while in FIG. 18 that which is controlled is the rotational speed of the regenerating side fan 1 (the regenerating air flow rate); however, one may also consider controlling instead the rotational speeds of the desiccant rotors 3 and 4, or controlling the exit temperatures of the air heated by the hot water coils 7 and 8. For example, in Japanese Unexamined Patent Application Publication 2003-262376, the humidity within the room is detected and the heating temperature on the regenerating side is controlled based on the humidity that is detected.

However, even though it is possible to reduce the energy consumption by constraining a control value for that which is being controlled in a system wherein the regenerating air flow rate is controlled in this way, or wherein the rotational speeds of the desiccant rotors are controlled in this way, or wherein the exit temperatures of the hot water coils are controlled in this way, it cannot be said that the reduction in energy consumption is adequate, and it is desirable to achieve even greater energy conservation.

The present invention is to solve such a problem, and the object thereof is to provide a desiccant air conditioning system, and operating method thereof, able to achieve further energy conservation through reducing energy consumed in the pre-cooling coil for processing supply air, while maintaining the target dew point temperature in the air-conditioned space.

SUMMARY

An invention by which to achieve an object such as set forth above is a desiccant air-conditioning system includes a regenerating side fan for forming a regenerating side air flow, a processing side fan for forming a processing side air flow, a first desiccant rotor that is disposed bridging a downstream side of a regenerating side air flow path and an upstream side of a processing side air flow path, for continuously adsorbing moisture from the processing side and desorbing moisture to the regenerating side while rotating, a second desiccant rotor that is disposed bridging an upstream side of a regenerating side air flow path and a downstream side of a processing side air flow path, for continuously adsorbing moisture from the processing side and desorbing moisture to the regenerating side while rotating, a first pre-cooling device for cooling air on the processing side prior to adsorption of moisture by the first desiccant rotor, a second pre-cooling device for cooling air on the processing side prior to adsorption of moisture by the second desiccant rotor, a first heating device for heating air on the regenerating side prior to desorption of moisture by the first desiccant rotor, a second heating device for heating air on the regenerating side prior to desorption of moisture by the second desiccant rotor, and an air-conditioned space for receiving supply of air that has been dried of the processing side, for which moisture has been absorbed by the second desiccant rotor, includes water content amount detecting means for detecting the water content amount at a specific location that has been determined in a flow path where in dried air flows on the processing side; control value determining means for determining the flow rate of air on the regenerating side, the speed of rotation of the desiccant controller, and/or the exit temperature of the air heated by the heating device, as that which is controlled, and for determining a control value for that which is controlled to cause the water content amount, detected by the water content amount detecting means, to go to a target water content amount; and second pre-cooling device exit temperature setting means for determining a setting value for the exit temperature of the air that is cooled by the second pre-cooling device in accordance with the control value determined by the control value determining means.

In the present invention, the amount of moisture content at a specific location that is determined within the flow path on the processing side wherein dried air flows is detected, and a control value is determined for that which is controlled so that the amount of water content detected will become a target amount of water content. Given this, a setting value for an exit temperature of air that is cooled by the second pre-cooling device is determined in accordance with the control value that has been determined for that which is controlled.

In the example, a flow rate of air on the regenerating side, a rotational speed for a desiccant rotor, and/or an exit temperature of air that is heated by a heating device is that which is controlled. For example, if the second pre-cooling device is a pre-cooling coil for processing supply air and the flow rate of the air on the regenerating side is that which is controlled, then the pre-cooling coil exit temperature setting value for processing the supply air would be determined in accordance with the flow rate that is determined for the air on the regenerating side (where if the control value were a control value in the direction that reduces the flow rate of the air on the regenerating side, then the pre-cooling coil exit temperature setting value for processing the supply air would be increased in accordance with that control value).

EFFECTS OF THE INVENTION

Given the present example, a flow rate of air on the regenerating side, a rotational speed of a desiccant rotor, and/or an exit temperature of air heated by a heating device is used as that which is controlled, and a control value for that which is controlled is determined so that the amount of water content that is detected will go to a target amount of water content, while, additionally, a setting value for the exit temperature of the air that is cooled by the second pre-cooling device is determined in accordance with the control value that has been determined, so that if the control value is a control value in the direction that increases the amount of water content that is detected up to the amount of water content that is targeted, the setting value for the exit temperature of the air that is cooled by the second pre-cooling device will be increased in accordance with the control value, thus making it possible to reduce energy consumed by the pre-cooling coil for processing the supply air, while maintaining the target dew point temperature within the air-conditioned space, thus enabling the achievement of greater energy conservation.

DETAILED DESCRIPTION

A form of example is explained below in detail, based on the drawings.

Figure 1:
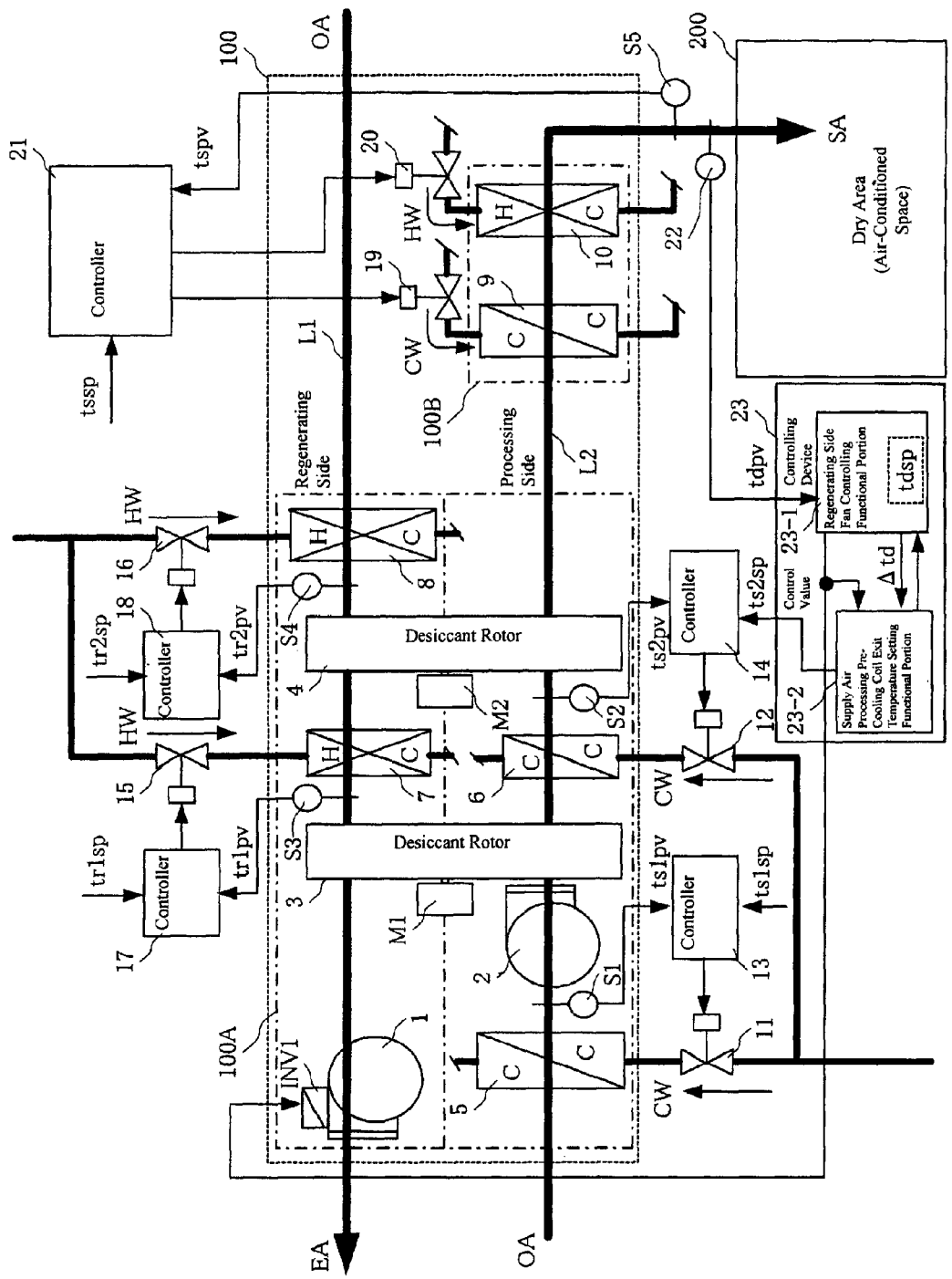
FIG. 1 is a diagram illustrating schematically an example of a desiccant air-conditioning system according to the present invention.
Figure 18:
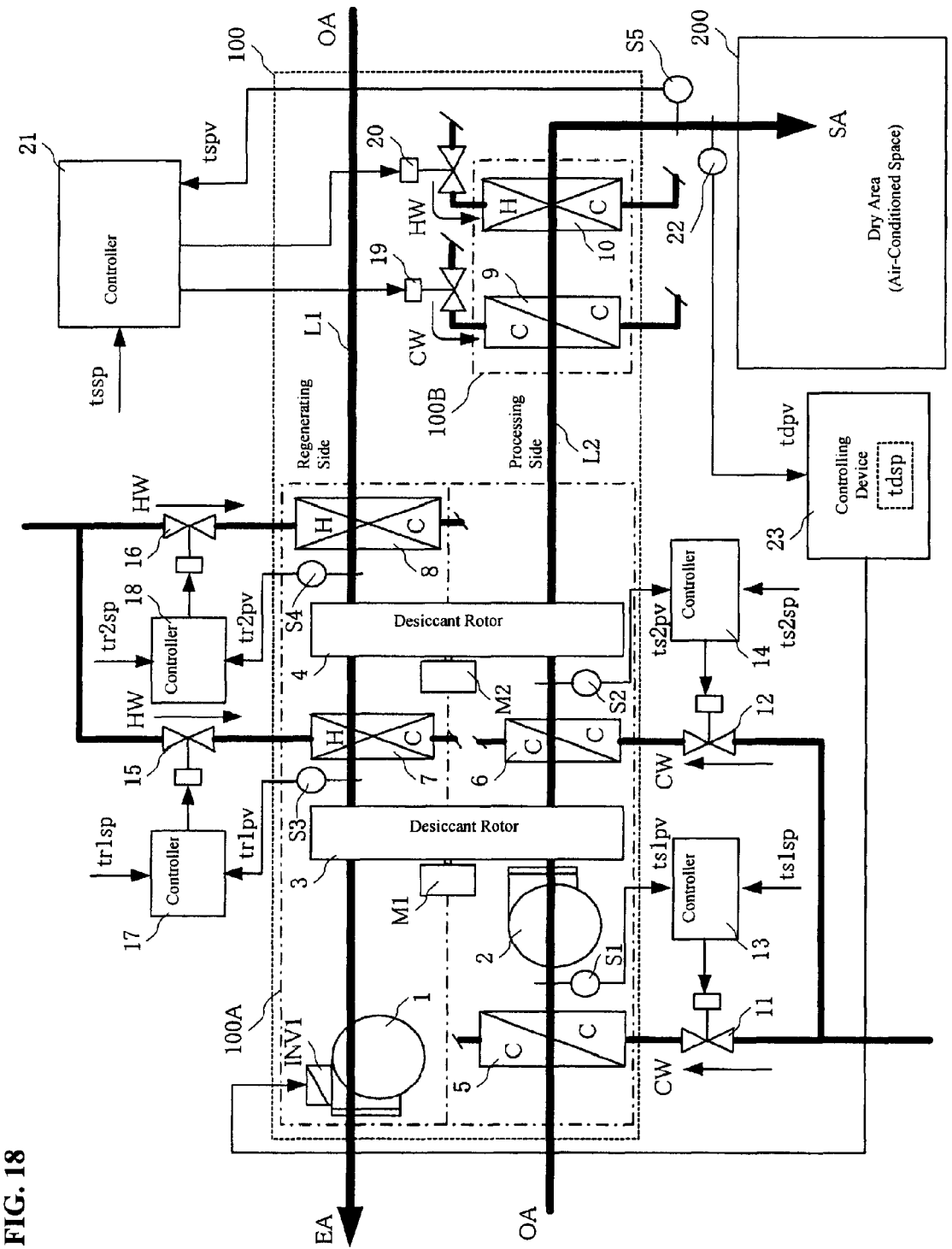
FIG. 18 is a diagram illustrating schematically a desiccant air-conditioning system wherein the rotational speed of the regenerating side fan (the regenerating air flow rate) is controlled to cause the supply air dew point temperature to match a target dew point temperature.

FIG. 1 is a diagram illustrating schematically one example of a desiccant air-conditioning system. In this figure, codes that are the same as those in FIG. 18 indicate identical or equivalent structural elements as the structural elements explained in reference to FIG. 18, and explanations thereof are omitted.

In this example, the controlling device 23 is provided with a regenerating side fan controlling functional portion 23-1 for controlling the rotational speed of the regenerating side fan 1, and a supply air processing pre-cooling coil exit temperature setting functional portion 23-2 for setting a supply air processing pre-cooling coil exit temperature setting value ts2$sp$ in a controller 14.

The regenerating side fan controlling functional portion 23-1 produces a control value for causing the supply air dew point temperature tdpv that is detected by a dew point temperature sensor 22 to go to a target dew point temperature tdsp, where this control value that has been produced is sent to an inverter INV1 that is provided on the regenerating side fan 1. Note that in this example the control value that is generated by the regenerating side fan controlling functional portion 23-1 is a regenerating air flow rate, where this regenerating air flow rate is sent to the regenerating side fan 1 as an inverter value.

The supply air processing pre-cooling coil exit temperature setting functional portion 23-2 uses the control value from the regenerating side fan controlling functional portion 23-1 to the regenerating side fan 1 as a branch input, to determine the supply air processing pre-cooling exit temperature setting value ts2$sp$ in accordance with the inputted control value, following a relationship that has been set in advance, and sets this supply air processing pre-cooling coil exit temperature setting value ts2$sp$, which has been determined, into the controller 14.

Figure 4:
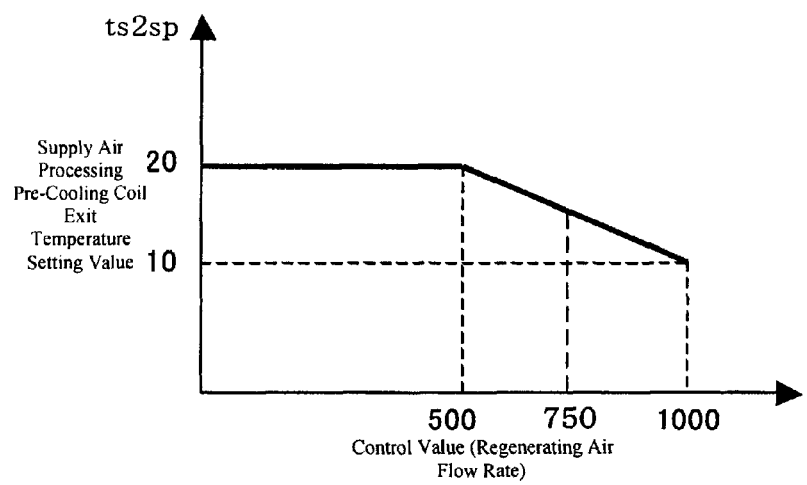
FIG. 4 is a diagram illustrating the relationship between a control value (the regenerating air flow rate) and the supply air processing pre-cooling coil exit temperature setting value in a supply air processing pre-cooling coil exit temperature setting functional portion.

FIG. 4 illustrates the relationship between a control value (the regenerating air flow rate) and the supply air processing pre-cooling coil exit temperature setting value ts2$sp$ in a supply air processing pre-cooling coil exit temperature setting functional portion 23-2. This relationship may be established as a conversion equation, or may be stored in memory as a table of values showing the relationships between the two.

If the relationship between the control value (the regenerating air flow rate) and the supply air processing pre-cooling coil exit temperature setting value ts2$sp$ is followed, then when the control value (the regenerating air flow rate) is reduced, then the supply air processing pre-cooling coil exit temperature setting value ts2$sp$ will increase, and the amount of cold water CW that is supplied to the supply air processing pre-cooling coil 6 will be reduced (referencing the range of between 500 and 1000 for the control value). Conventionally the supply air processing pre-cooling coil exit temperature setting value ts2$sp$ is set to a constant temperature envisioning the peak value for the water content load, in order to stabilize the air-conditioning system, and thus many times during the year it will be excessively high. In contrast, in the present example, when the water content load is reduced and the control value (the regenerating air flow rate) is reduced, the supply air processing pre-cooling coil exit temperature setting value ts2$sp$ is increased, thus reducing the energy consumption due to the heat exchange in the supply air processing pre-cooling coil 6 while maintaining the stability of the air-conditioning system.

Two functional examples (Case 1) and (Case 2) are explained below for a regenerating side fan controlling function and a supply air processing pre-cooling coil exit temperature setting function of a controlling device 23. Note that the controlling device 23 is embodied through hardware, including a processor and a storage device, and a program that achieves a variety of functions in cooperation with this hardware.

Case 1

Figure 2:
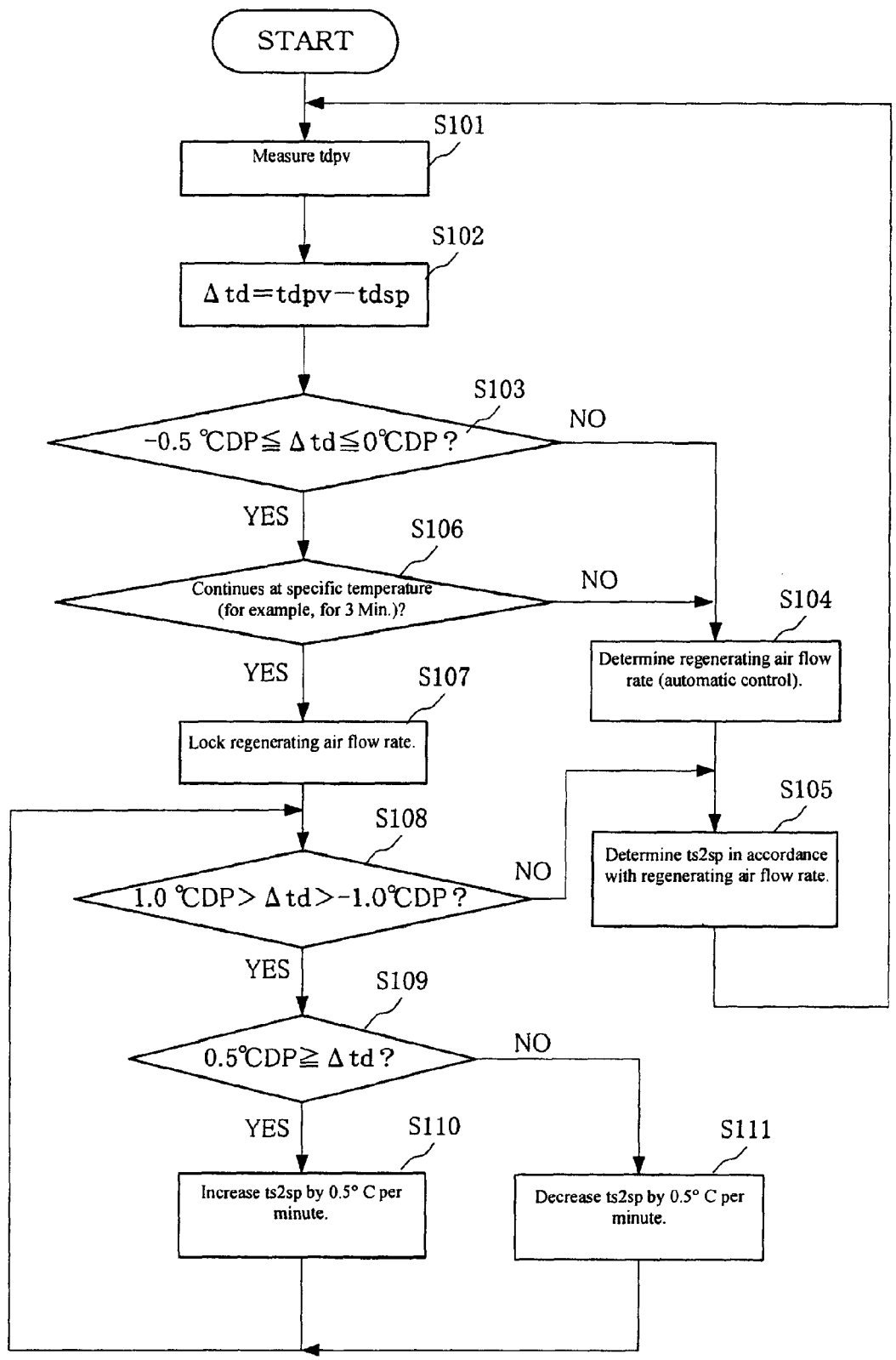
FIG. 2 is a flowchart for explaining Case 1 of a regenerating side fan controlling function and a supply air processing pre-cooling coil exit temperature setting function of a controlling device in the desiccant air-conditioning system.

The regenerating side fan controlling functional portion 23-1 samples, at regular intervals, the supply air dew point temperature tdpv from the dew point temperature sensor 22 (FIG. 2: Step S101), and calculates a dew point temperature difference, $\Delta td$ ($\Delta td = tdpv - tdsp$) between this supply air dew point temperature tdpv and a target dew point temperature tdsp that has been set in advance (Step S102).

Note that in this case the supply air dew point temperature tdpv reflects the amount of water content that is included in the supply air SA, where the supply air dew point temperature tdpv being high indicates that the amount of water content included in the supply air SA is large, and the supply air dew point temperature tdpv being low indicates that the amount of water content included in the supply air SA is small.

If Not −0.5° C. DP≤Δtd≤0° C. DP

If the dew point temperature difference Δtd is not in the range of −0.5° C. DP≤Δtd≤0° C., that is, if the dew point temperature difference Δtd is such that Δtd>0° C. DP or Δtd<−0.5° C. DP (Step S103: NO), then the regenerating side fan controlling functional portion 23-1 determines a control value (a regenerating air flow rate) that will cause the supply air dew point temperature tdpv to go to the target dew point temperature tdsp (Step S104).

Moreover, the supply air processing pre-cooling coil exit temperature setting functional portion 23-2 follows the relationship illustrated in FIG. 4 to determine the supply air processing pre-cooling coil exit temperature setting value ts2sp in accordance with the control value (the regenerating air flow rate) that has been determined by the regenerating side fan controlling functional portion 23-1 (Step S105).

In this case, if the dew point temperature difference Δtd is Δtd<−0.5° C. DP, then the regenerating side fan controlling functional portion 23-1 produces a control value that reduces the regenerating air flow rate, but if Δtd>0° C. DP, then the regenerating side fan controlling functional portion 23-1 produces a control value that increases the regenerating air flow rate. Moreover, if, for example, the current regenerating air flow rate is 750 and the control value (the regenerating air flow rate) determined by the regenerating side fan controlling functional portion 23-1 is 800 (higher), then the supply air processing pre-cooling coil exit temperature setting functional portion 23-2 dew point temperature reduces the supply air processing pre-cooling coil exit temperature setting value ts2sp, and if, for example, the current regenerating air flow rate is 750 and the control value (the regenerating air flow rate) determined by the regenerating side fan controlling functional portion 23-1 is 700 (lower), then the supply air processing pre-cooling coil exit temperature setting functional portion 23-2 increases the supply air processing pre-cooling coil exit temperature setting value ts2sp.

If Δtd<−0.5° C. DP

If the dew point temperature difference Δtd is such that Δtd<−0.5° C. DP, then the regenerating side fan controlling functional portion 23-1 sends a control value to the inverter INV1 that is provided on the regenerating side fan 1, to reduce the regenerating air flow rate. Doing so reduces the amount of desorption of the water content on the regenerating side in the desiccant rotors 3 and 4, reducing the amount of adsorption of water content on the processing side, increasing the supply air dew point temperature dtpv, causing it to go to the target dew point temperature tdsp.

When, in this control, the regenerating air flow rate is reduced, the temperature of the regenerating air from the hot water coils 7 and 8 increases. In this case the controllers 17 and 18 that are provided for the hot water coils 7 and 8 control the degrees of opening of hot water valves 15 and 16 so as to maintain the temperatures of the regenerating air at the setting temperatures tr1sp and tr2sp. Doing so reduces the amount of hot water (the amount of heat) supplied to the hot water coils 7 and 8, thereby reducing the energy consumed by the hot water coils 7 and 8.

On the other hand, if, for example, the current regenerating air flow rate is 750 and the control value (the regenerating air flow rate) determined by the regenerating side fan controlling functional portion 23-1 is 700 (lower), then the supply air processing pre-cooling coil exit temperature setting functional portion 23-2 increases the supply air processing pre-cooling coil exit temperature setting value ts2sp according to the relationship shown in FIG. 4.

In this case, the controller 14 that is provided for the pre-cooling coil 6 controls the degree of opening of the cold water valve 12 in order to maintain the pre-cooling coil exit temperature ts2pv at the supply air processing pre-cooling coil exit temperature setting value ts2sp. Doing so reduces the amount of cold water CW (the amount of cold) supplied to the pre-cooling coil 6, thereby reducing the energy consumed in the pre-cooling coil 6, achieving further energy conservation.

Figure 5:
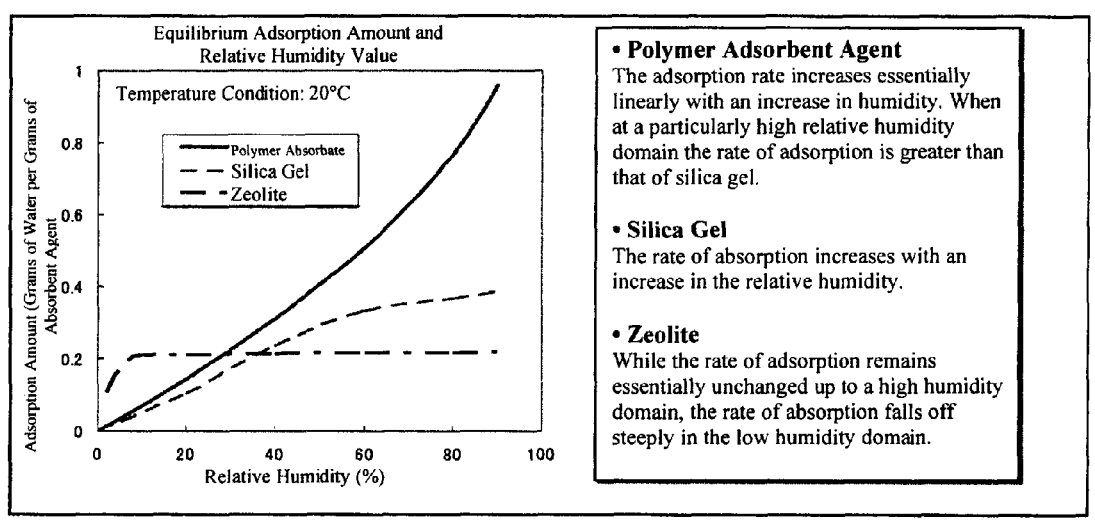
FIG. 5 is a diagram illustrating an example of the relationship between the relative humidity and the amount of water content adsorbed by the adsorbing agent in the desiccant rotor.

In this case, through increasing the supply air processing pre-cooling coil exit temperature setting value ts2sp, when the pre-cooling coil exit temperature ts2pv increases, the relative humidity of the air in the entrance to the desiccant rotor 4 for processing the supply air is decreased. When the relative humidity of the air is decreased, then the amount of moisture content adsorbed by the adsorbing agent in the desiccant rotor 4 for processing the supply air is reduced. (See FIG. 5.) However, the absolute humidity at the entrance to the desiccant rotor 4 for processing the supply air when the water content load is reduced is smaller, so even if the supply air processing pre-cooling coil exit temperature setting value ts2sp is increased by about 10° C., for example, the relative humidity falls by only about several percent. (See FIG. 6.) Because the reduction in the relative humidity is trivial, no large difference is produced in the amount of adsorption by the desiccant rotor 4 for processing the supply air through the increase in the supply air processing pre-cooling coil exit temperature setting value ts2sp. Because of this, even if the supply air processing pre-cooling coil exit temperature setting value ts2sp is increased, it is still possible to reduce the regenerating air flow rate to cause the supply air dew point temperature tdpv to go to the target dew point temperature tdsp in a state that is essentially the same as prior to the increase in the supply air processing pre-cooling coil exit temperature setting value ts2sp.

If Δtd>0° C. DP

If the dew point temperature difference Δtd is such that Δtd>0° C. DP, then the regenerating side fan controlling functional portion 23-1 sends a control value to the inverter INV1 that is provided on the regenerating side fan 1, to increase the regenerating air flow rate. Doing so increases the amount of desorption of the water content on the regenerating side in the desiccant rotors 3 and 4, increasing the amount of adsorption of water content on the processing side, decreasing the supply air dew point temperature dtpv, causing it to go to the target dew point temperature tdsp.

In this case, if, for example, the current regenerating air flow rate is 750 and the control value (the regenerating air flow rate) determined by the regenerating side fan controlling functional portion 23-1 is 750 (higher), then the supply air processing pre-cooling coil exit temperature setting functional portion 23-2 decreases the supply air processing pre-cooling coil exit temperature setting value ts2sp according to the relationship shown in FIG. 4. As a result, the relative humidity of the air at the entrance to the desiccant rotor 4 for processing the supply air will increase, increasing the amount of water content that is adsorbed by the adsorbing agent in the desiccant rotor 4 for processing the supply air, enabling the desiccant rotor 4 to adsorb only the required amount of the water content, making it possible to reduce the supply air dew point temperature tdpv to the target dew point temperature tdsp.

The controlling device 23 repeats the processing operations in the aforementioned Steps S101 through S105 until the state wherein −0.5° C. DP≤Δtd≤0° C. DP persists over a specific amount of time (for example 3 min.) (Step S106:

YES). That is, the determination of the regenerating air flow rate in the regenerating side fan controlling functional portion 23-1 (the automatic control) (Step S104) and the determination of the supply air processing pre-cooling coil exit temperature setting value ts2sp in accordance with the regenerating air flow rate in the supply air processing pre-cooling coil exit temperature setting functional portion 23-2 (Step S105) are repeated.

When the State of −0.5° C. DP≤Δtd≤0° C. DP Persists over a Specific Amount of Time When the state wherein the dew point temperature difference Δtd is such that −0.5° C. DP≤Δtd≤0° C. DP endures for a specific amount of time (Step S106: YES), then the regenerating side fan controlling functional portion 23-1 locks the control value (the regenerating air flow rate) (Step S107).

Figures 6, 7:
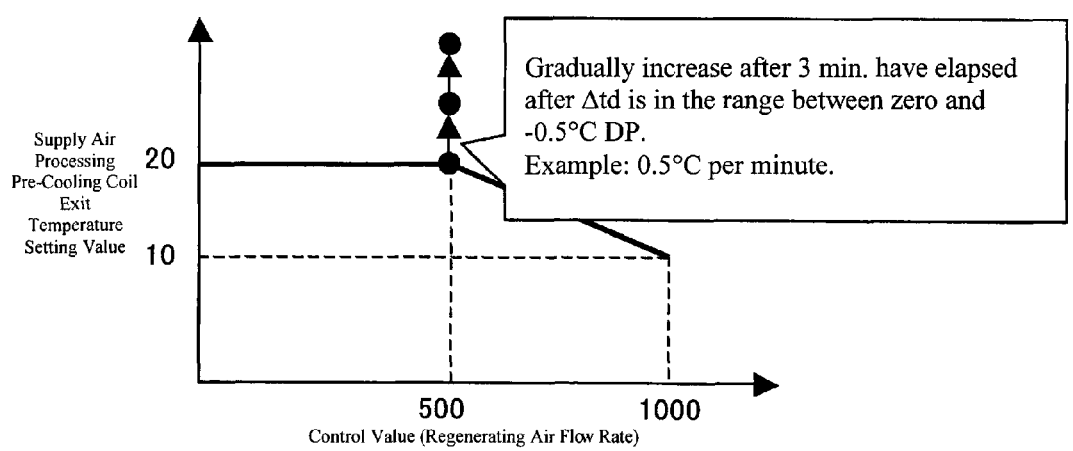
FIG. 6 is a diagram illustrating the relationship between the dew point temperature, the dry bulb temperature, and the relative humidity.
FIG. 7 is a diagram illustrating the state wherein, in Case 1, the control value (the regenerating air flow rate) is constant at 500 and the supply air processing pre-cooling coil exit temperature setting value is increased gradually.

When the control value (the regenerating air flow rate) from the regenerating side fan controlling functional portion 23-1 is locked, then the supply air processing pre-cooling coil exit temperature setting functional portion 23-2 gradually increases the supply air processing pre-cooling coil exit temperature setting value ts2sp at a rate of, for example, 0.5° C. per minute (Step S110). FIG. 7 shows a state wherein the supply air processing pre-cooling coil exit temperature setting value ts2sp is gradually increased while the control value (the regenerating air flow rate) is locked at 500.

Figure 8:
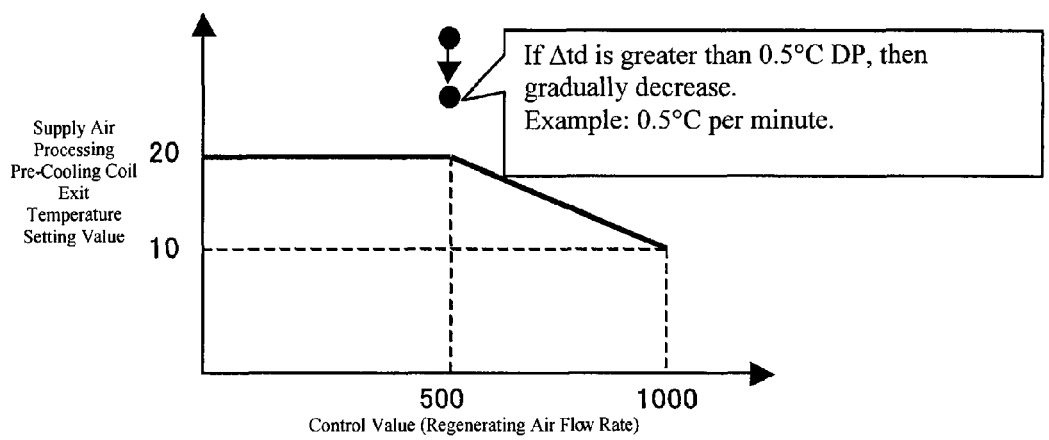
FIG. 8 is a diagram illustrating the state wherein, in Case 1, the control value (the regenerating air flow rate) is constant at 500 and the supply air processing pre-cooling coil exit temperature setting value is decreased gradually.

Additionally, when the dew point temperature difference Δtd exceeds 0.5° C. DP (Step S109: NO), then the supply air processing pre-cooling coil exit temperature setting functional portion 23-2 gradually decreases the supply air processing pre-cooling coil exit temperature setting value ts2sp at a rate of, for example, 0.5° C. per minute (Step S111). FIG. 8 shows a state wherein the supply air processing pre-cooling coil exit temperature setting value ts2sp is gradually decreased while the control value (the regenerating air flow rate) is locked at 500.

Figure 9:
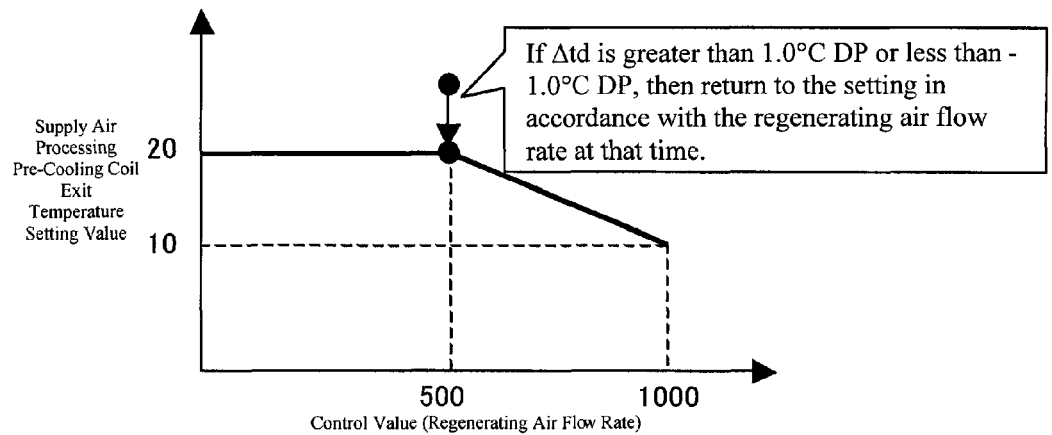
FIG. 9 is a diagram illustrating the state wherein, in Case 1), the supply air processing pre-cooling coil exit temperature setting value is returned to a supply air processing pre-cooling coil exit temperature setting value in accordance with the control value (the regenerating air flow rate) at that time.

Note that if, while the supply air processing pre-cooling coil exit temperature setting value ts2sp is being increased in Step S110, or the supply air processing pre-cooling coil exit temperature setting value ts2sp is being decreased during Step S111, there is a large change in the dew point temperature difference Δtd, for example, if it goes outside of the range of 1.0° C. DP>Δtd>−1.0° C. DP (Step S108: NO), then the supply air processing pre-cooling coil exit temperature setting functional portion 23-2 returns the supply air processing pre-cooling coil exit temperature setting value ts2sp so the supply air processing pre-cooling coil exit temperature setting value ts2sp in accordance with the control value (the regenerating air flow rate) at that time (Step S1 105; see FIG. 9), and a notification to that extent is sent to the regenerating side fan controlling functional portion 23-1.

As a result, the controlling device 23 restarts the process operations of Step S101 through S105, described above. That is, the determination of the regenerating air flow rate in the regenerating side fan controlling functional portion 23-1 (the automatic control) (Step S104) and the determination of the supply air processing pre-cooling coil exit temperature setting value ts2sp in accordance with the regenerating air flow rate in the supply air processing pre-cooling coil exit temperature setting functional portion 23-2 (Step S105) are restarted, the regenerating air flow rate is locked (Step S107) in response to YES in Step S106, and the operations are repeated as described above.

Case 2

Figure 3:
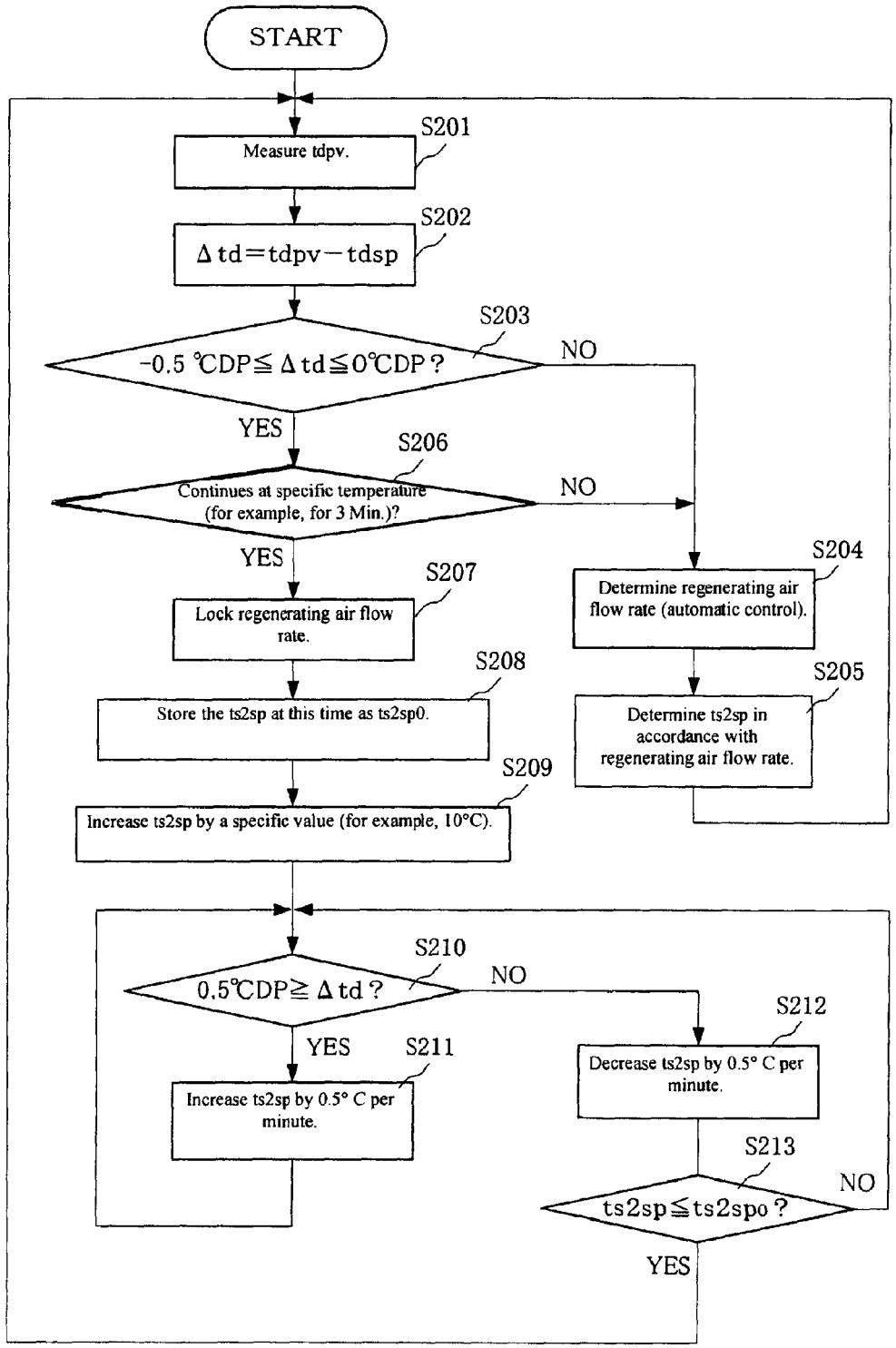
FIG. 3 is a flowchart for explaining Case 2 of a regenerating side fan controlling function and a supply air processing pre-cooling coil exit temperature setting function of a controlling device in the desiccant air-conditioning system.

The regenerating side fan controlling functional portion 23-1 samples, at regular intervals, the supply air dew point temperature tdpv from the dew point temperature sensor 22 (FIG. 3: Step S201), and calculates a dew point temperature difference, Δtd (Δtd=tdpv−tdsp) between this supply air dew point temperature tdpv and a target dew point temperature tdsp that has been set in advance (Step S202).

If Not −0.5° C. DP≤Δtd≤0° C. DP

If the dew point temperature difference Δtd is not in the range of −0.5° C. DP≤Δtd≤0° C. (Step S203: NO), then, in the same manner as in Step S104, above, the regenerating side fan controlling functional portion 23-1 determines a control value (a regenerating air flow rate) that will cause the supply air dew point temperature tdpv to go to the target dew point temperature tdsp (Step S204).

Moreover, the supply air processing pre-cooling coil exit temperature setting functional portion 23-2 determines the supply air processing pre-cooling coil exit temperature setting value ts2sp in accordance with the control value (the regenerating air flow rate) that has been determined by the regenerating side fan controlling functional portion 23-1 in the same manner as in Step S105, above (Step S205).

The controlling device 23 repeats the processing operations in the aforementioned Steps S201 through S205 until the state wherein −0.5° C. DP≤Δtd≤0° C. DP persists over a specific amount of time (for example 3 min.) (Step S206: YES). That is, the determination of the regenerating air flow rate in the regenerating side fan controlling functional portion 23-1 (the automatic control) (Step S204) and the determination of the supply air processing pre-cooling coil exit temperature setting value ts2sp in accordance with the regenerating air flow rate in the supply air processing pre-cooling coil exit temperature setting functional portion 23-2 (Step S205) are repeated.

When the State of −0.5° C. DP≤Δtd≤0° C. DP Persists over a Specific Amount of Time When the state wherein the dew point temperature difference Δtd is such that −0.5° C. DP≤Δtd≤0° C. DP endures for a specific amount of time (Step S206: YES), then the regenerating side fan controlling functional portion 23-1 locks the control value (the regenerating air flow rate) (Step S207).

Figure 10:
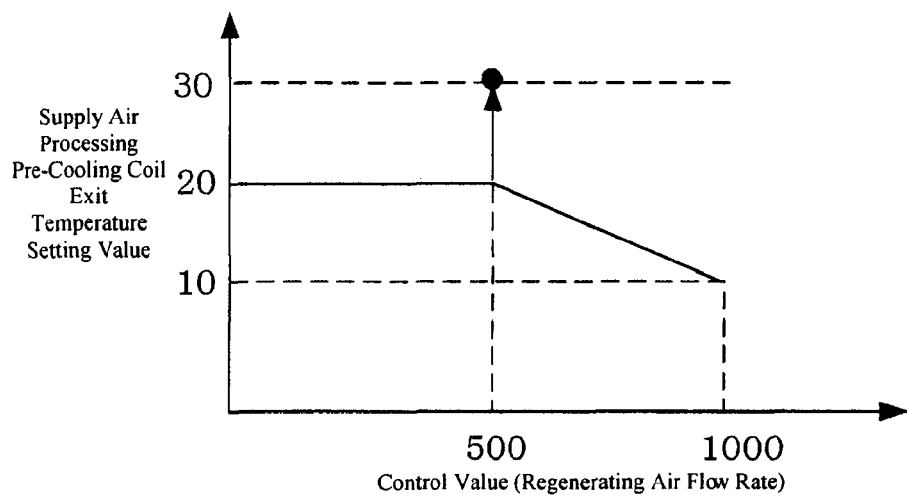
FIG. 10 is a diagram illustrating the state wherein, in Case 2, the control value (the regenerating air flow rate) is constant at 500 and the supply air processing pre-cooling coil exit temperature setting value has been increased to a specific temperature.

When the control value (the regenerating air flow rate) from the regenerating side fan controlling functional portion 23-1 is locked, then the supply air processing pre-cooling coil exit temperature setting functional portion 23-2 not only stores the supply air processing pre-cooling coil exit temperature setting value ts2sp as the setting value ts2sp0 for when the regenerating air flow rate is locked (Step S208) and the supply air processing pre-cooling coil exit temperature setting value ts2sp is increased by a specific value (for example, 10° C.) (Step S209). FIG. 10 shows a state wherein the supply air processing pre-cooling coil exit temperature setting value ts2sp has been increased by 10° C. while the control value (the regenerating air flow rate) is locked at 500.

Figure 11:
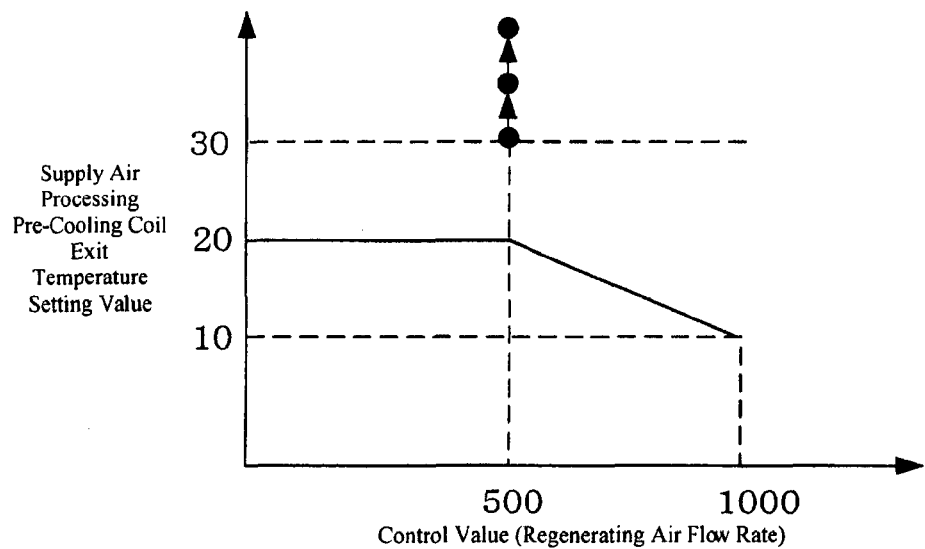
FIG. 11 is a diagram illustrating the state wherein, in Case 2, the control value (the regenerating air flow rate) is constant at 500 and the supply air processing pre-cooling coil exit temperature setting value is increased gradually.

After the supply air processing pre-cooling coil exit temperature setting functional portion 23-2 increases the supply air processing pre-cooling coil exit temperature setting value ts2sp to a specific value, it then increases the supply air processing pre-cooling coil exit temperature setting value ts2sp gradually at a rate of, for example, 0.5° C. per minute (Step S211). FIG. 11 shows a state wherein the supply air processing pre-cooling coil exit temperature setting value ts2sp is gradually increased while the control value (the regenerating air flow rate) is locked at 500.

Figure 12:
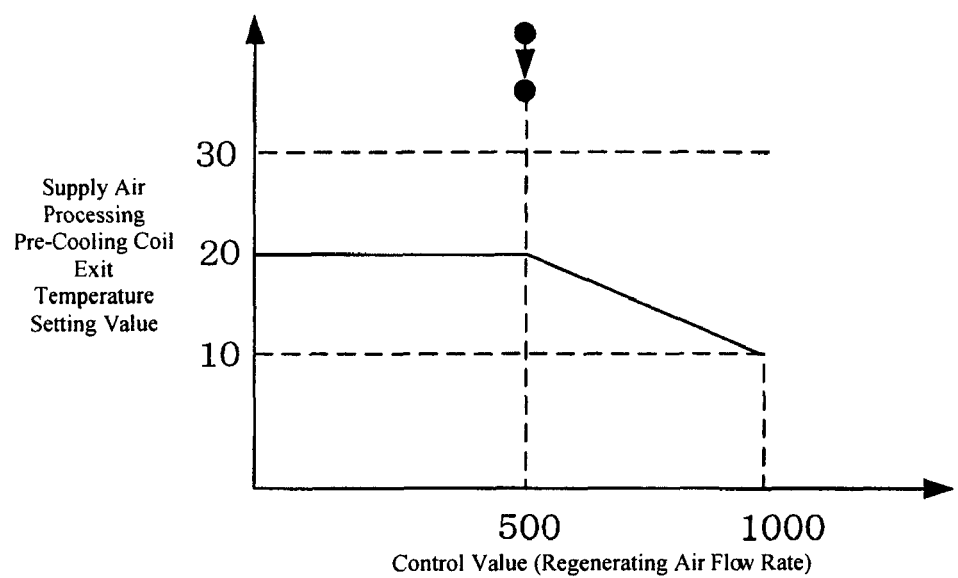
FIG. 12 is a diagram illustrating the state wherein, in Case 2, the control value (the regenerating air flow rate) is constant at 500 and the supply air processing pre-cooling coil exit temperature setting value is decreased gradually.

Additionally, when the dew point temperature difference Δtd exceeds 0.5° C. DP (Step S210: NO), then the supply air processing pre-cooling coil exit temperature setting functional portion 23-2 gradually decreases the supply air processing pre-cooling coil exit temperature setting value ts2sp at a rate of, for example, 0.5° C. per minute (Step S212). FIG. 12 shows a state wherein the supply air processing pre-cooling coil exit temperature setting value ts2$sp$ is gradually decreased while the control value (the regenerating air flow rate) is locked at 500.

After this, when the supply air processing pre-cooling coil exit temperature setting value ts2$sp$ has gone to or below the setting value ts2$sp0$ when the regenerating air flow rate, with which was stored in Step S208, is locked (Step S213: YES), then the supply air processing pre-cooling coil exit temperature setting functional portion 23-2 makes notification of this fact to the regenerating side fan controlling functional portion 23-1.

As a result, the controlling device 23 restarts the process operations of Step S201 through S205, described above. That is, the determination of the regenerating air flow rate in the regenerating side fan controlling functional portion 23-1 (the automatic control) (Step S204) and the determination of the supply air processing pre-cooling coil exit temperature setting value ts2$sp$ in accordance with the regenerating air flow rate in the supply air processing pre-cooling coil exit temperature setting functional portion 23-2 (Step S205) are restarted, the regenerating air flow rate is locked (Step S207) in response to YES in Step S206, and the operations are repeated as described above.

Note that if while the supply air processing pre-cooling coil exit temperature setting value ts2$sp$ in Step S213 is being reduced and the dew point temperature difference Δtd becomes less than 0.5° C. DP (Step S210: YES) prior to reaching the supply air processing pre-cooling coil exit temperature setting value ts2$sp0$, then the supply air processing pre-cooling coil exit temperature setting functional portion 23-2 advances to Step S211, and the increase at the rate of 0.5° C. per minute of the supply air processing pre-cooling coil exit temperature setting value ts2$sp$ is restarted.

Figure 13:
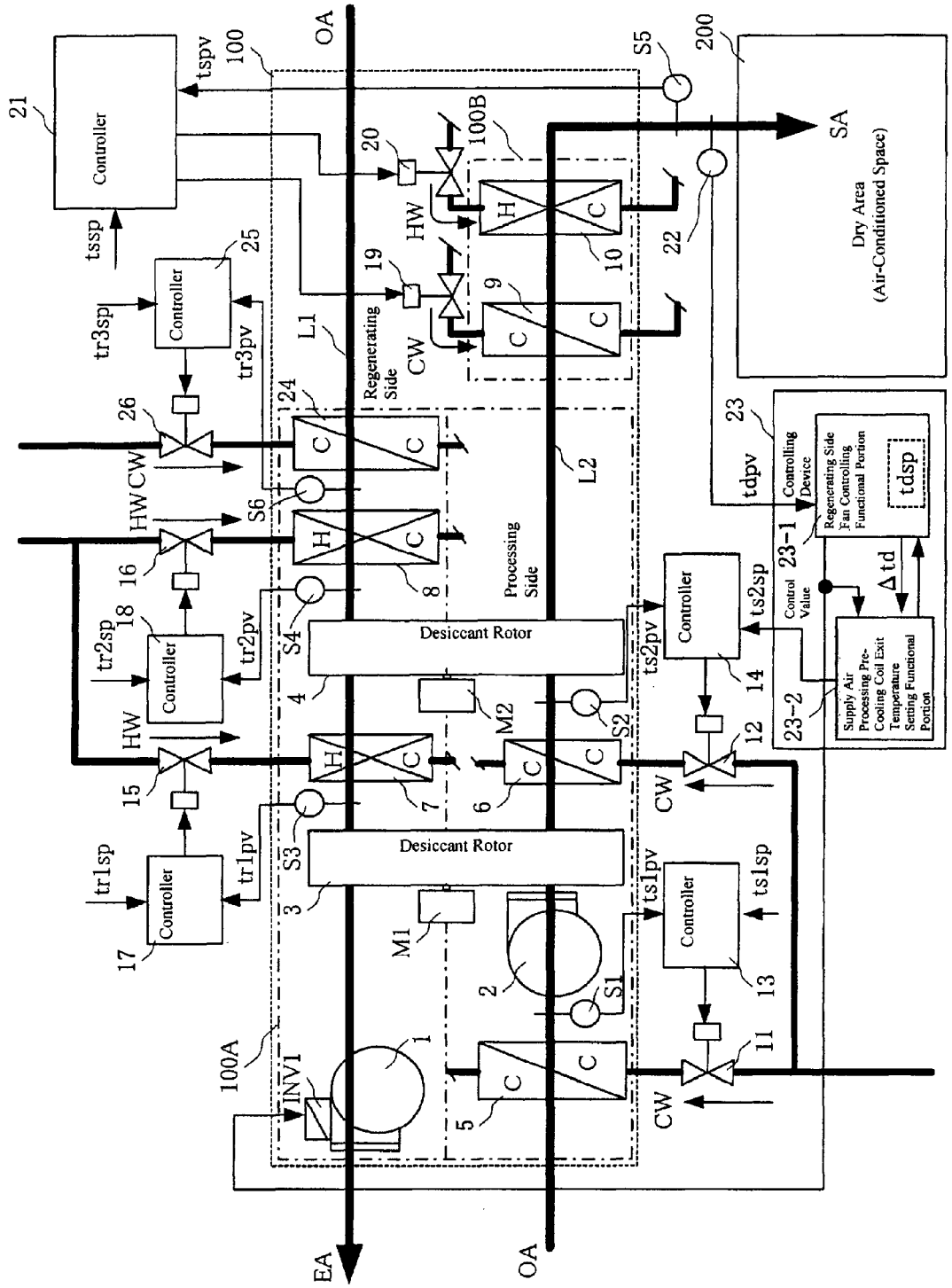
FIG. 13 is a diagram illustrating schematically another example of a desiccant air-conditioning system according to the present invention.

FIG. 13 is a diagram illustrating schematically another example of a desiccant air-conditioning system.

In this example, a cold water coil 24 was provided in a stage prior to the hot water coil 8 for heating the air on the regenerating side, prior to moisture removal, for the desiccant rotor 4 for supply air processing, where the exit temperature of the air that has been cooled by the cold water coil 24 is measured by a temperature sensor S6 as a cold water coil exit temperature tr3$pv$, and the degree of opening of a cold water valve 26 that is provided in the supply path for the cold water CW to the cold water coil 24 is controlled by a controller 25 so as to cause the cold water coil exit temperature tr3$pv$, which is measured by this temperature sensor S6, to match the setting temperature tr3$sp$.

In this other example, the outside air OA that is drawn in as the air on the regenerating side, after being subjected to cooling and moisture removal, is heated by the hot water coil 8 and supplied to the desiccant rotor 4 for processing the supply air.

Figure 14:
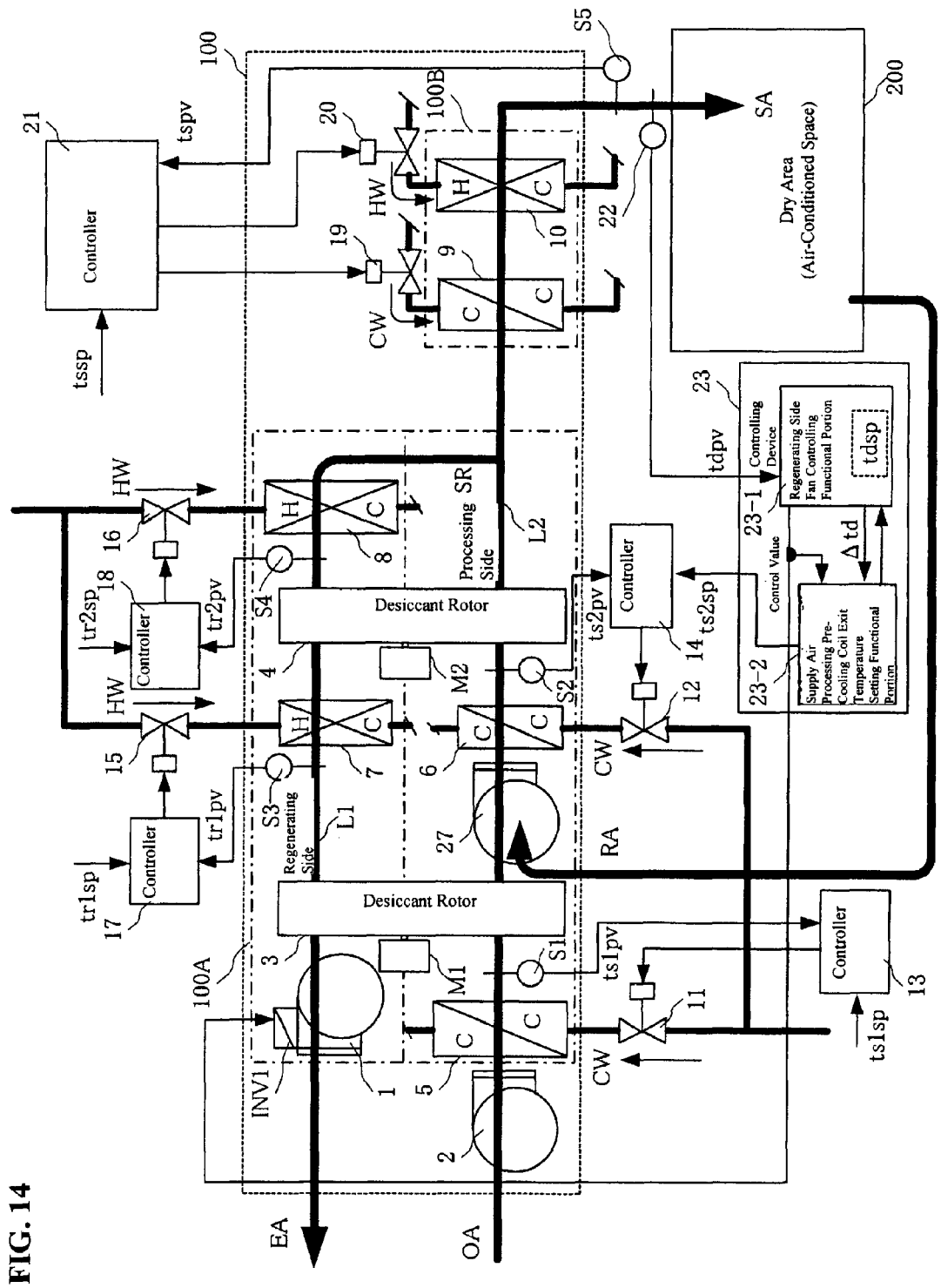
FIG. 14 is a diagram illustrating schematically a different example of a desiccant air-conditioning system according to the present invention.

FIG. 14 is a diagram illustrating schematically a separate example of a desiccant air-conditioning system according to the present invention.

In this example, a processing side fan 2 is provided at the entrance for the air on the processing side to a rotary moisture removing device 100A, and a constant flow rate fan 27 is provided, as a second processing side fan, in the flow path for the air on the processing side, between the outside air desiccant rotor 3 and the supply air processing desiccant rotor 4 of the rotary moisture removing device 100A.

Additionally, the return air RA from the dry area 200 and the air on the processing side from which moisture has been removed by the outside air processing desiccant rotor 3 are mixed, and this mixed air is passed through the supply air processing pre-cooling coil 6 and sent to the supply air processing desiccant rotor 4.

Additionally, the air on the processing side from which moisture has been removed by the supply air processing desiccant rotor 4 is branched, to produce regenerating side air SR, where this regenerating side air SR is passed through a hot water coil 8 and sent to the supply air processing desiccant rotor 4.

Figure 15:
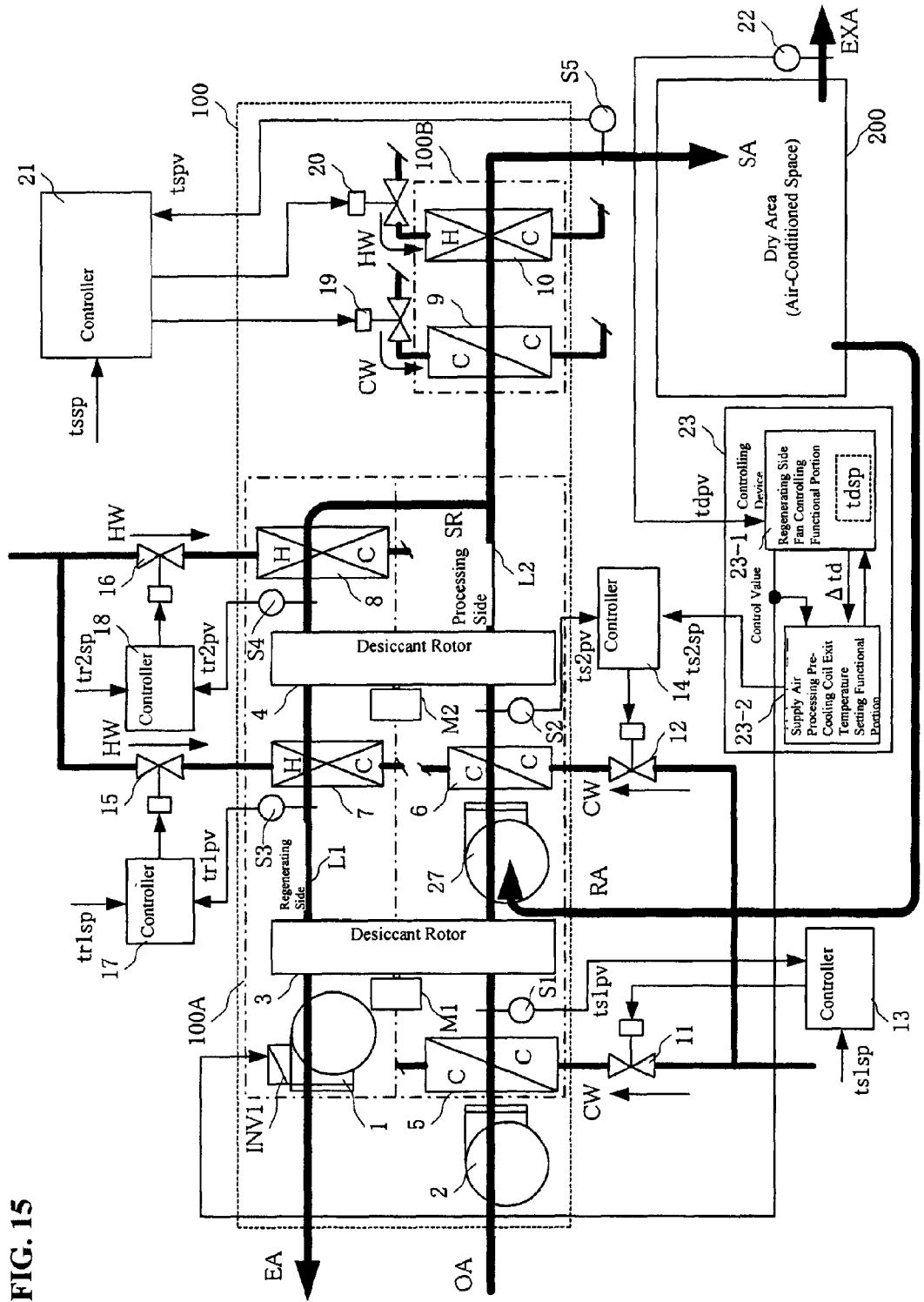
FIG. 15 is a diagram illustrating an alternate example wherein the dew point temperature of the return air from the dry area (the return air dew point temperature) is detected.

Note that while in the first through third forms of embodiment set forth above the dew point temperature of the supply air SA to the dry area 200 (the supply air dew point temperature) was detected by the dew point temperature sensor 22, instead the dew point temperature of the return air RA from the dry area 200 (the return air dew point temperature) may be detected by the dew point temperature sensor 22, as illustrated in the alternate example (FIG. 14) in FIG. 15, where the difference between the return air dew point temperature tdpv, detected by the dew point temperature sensor 22, and the target value tdsp for the return air dew point temperature may be calculated as the dew point temperature difference Δtd, and a control value for the regenerating side fan 1 (the regenerating air flow rate) and a supply air processing pre-cooling coil exit temperature setting value ts2$sp$ for the controller 14 may be determined.

Figure 16:
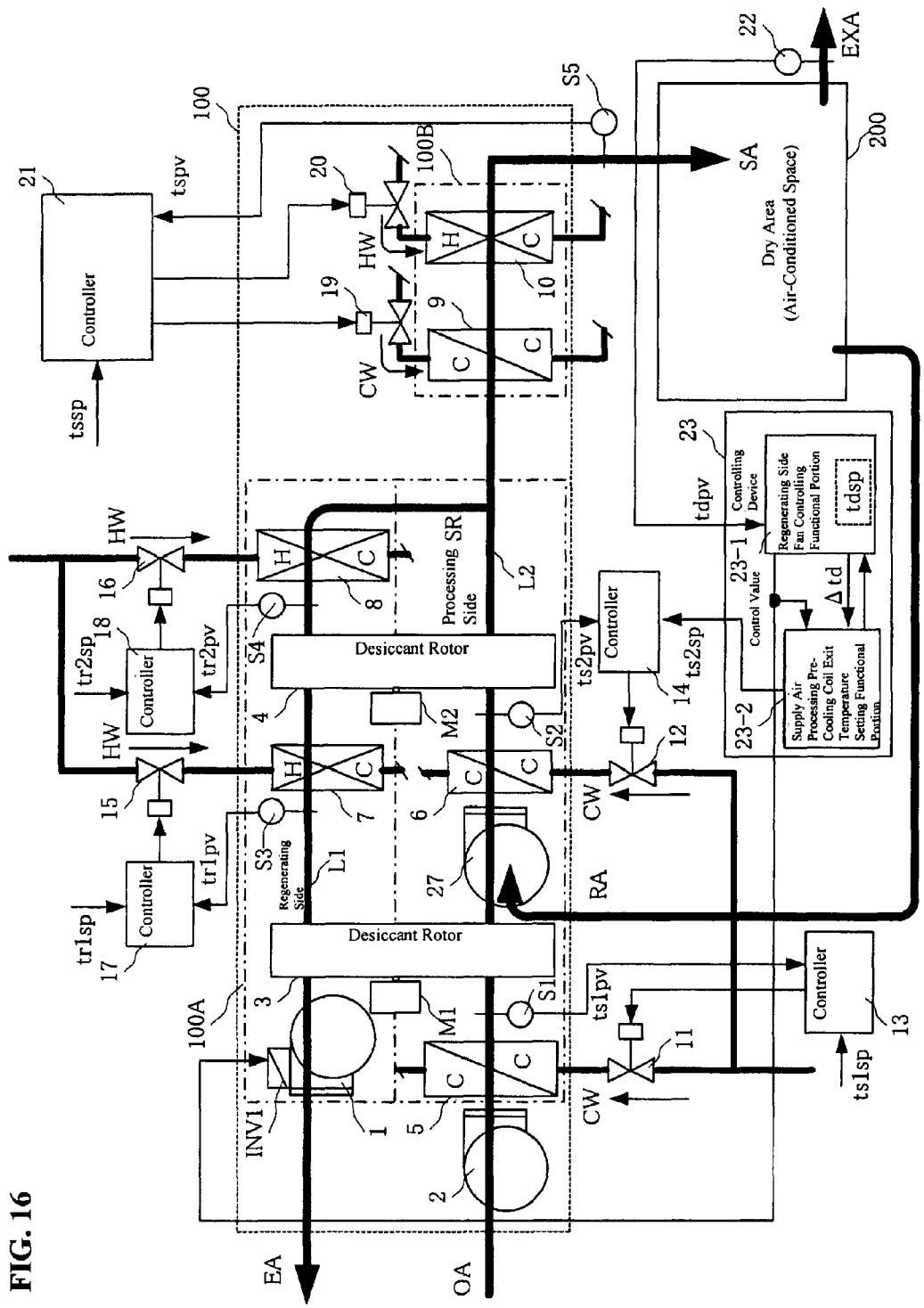
FIG. 16 is a diagram illustrating an alternate example wherein the dew point temperature of the exhaust air from the dry area (the exhaust air dew point temperature) is detected.
Figure 17:
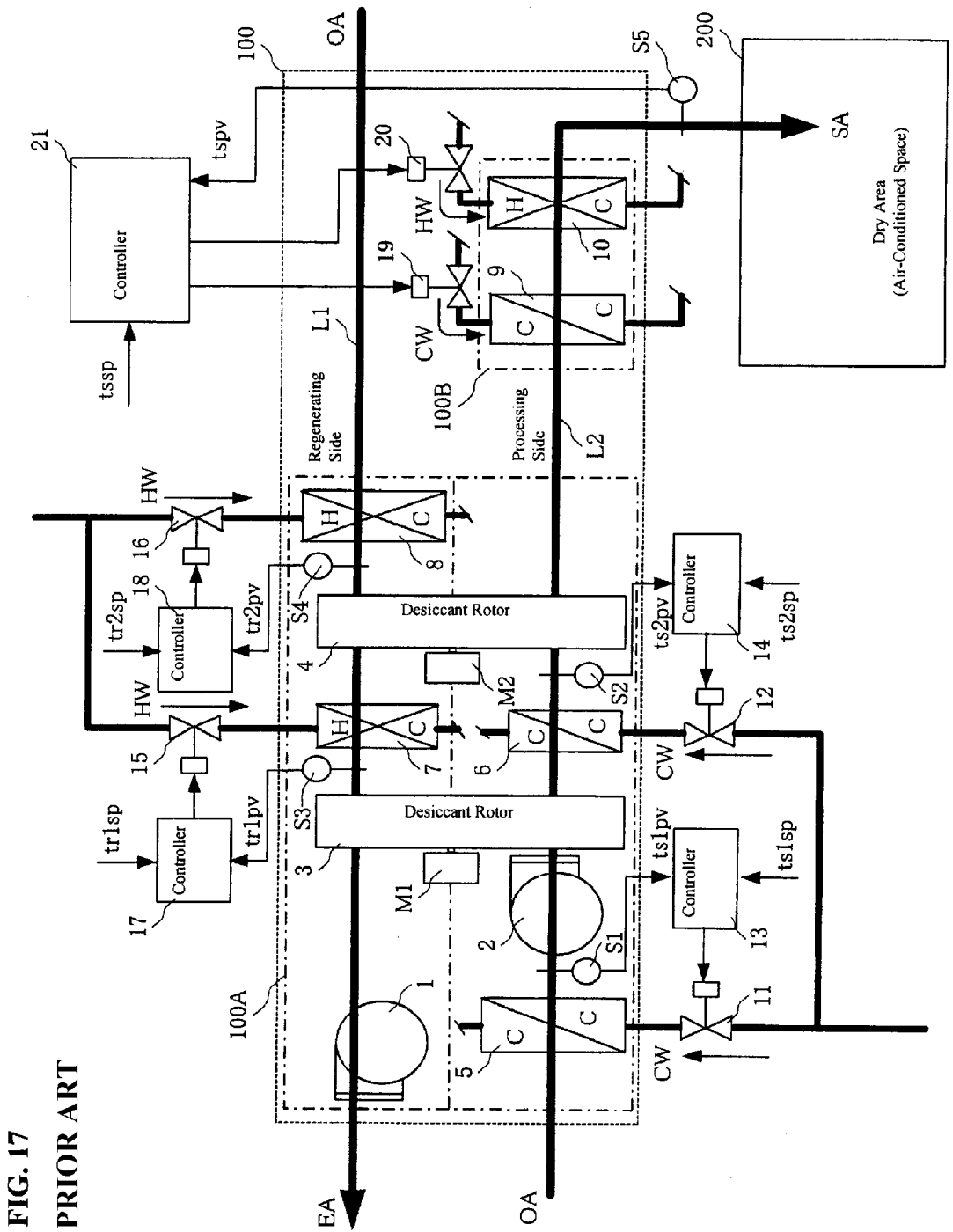
FIG. 17 is a diagram illustrating a schematic of a conventional desiccant air-conditioning system that uses a desiccant rotor.

Additionally, as illustrated in the alternate example of (FIG. 14) of FIG. 16, the dew point temperature of the exhaust air EXA from the dry area 200 (the exhaust air dew point temperature) may be detected by the dew point temperature sensor 22, and the difference between the exhaust air dew point temperature tdpv, detected by the dew point temperature sensor 22, and the target value tdsp for the exhaust air dew point temperature may be calculated as the dew point temperature difference Δtd, and a control value for the regenerating side fan 1 (the regenerating air flow rate) and a supply air processing pre-cooling coil exit temperature setting value ts2$sp$ for the controller 14 may be determined.

Additionally, the detection point for the dew point temperature need not necessarily be the supply air SA, the return air RA, or the exhaust air EXA, but instead the dew point temperature may be detected at any point insofar as it is in the flow path wherein air that has been dried on the processing side, after adsorption of moisture by the rotary moisture removing device 100A (dried air) flows. Moreover, the dew point temperature need not necessarily be detected, but instead a humidity may be detected. If it is a humidity that is detected, then a relative humidity may be detected, or an absolute humidity may be detected.

Additionally, the dew point temperature of the return air RA, for example, may be detected, and the rotational speed of the regenerating side fan 1 may be controlled (in cascade control) to cause the dew point temperature of the supply air SA to achieve a setting value by the dew point temperature of the return air RA that is detected.

Additionally, in the examples set forth above, the flow rates for the air on the regenerating side need not necessarily be controlled through the speed of rotation of the regenerating side fan 1, but rather a damper, for example, may be provided in a flow path of the air on the regenerating side, and the degree of opening of this damper may be adjusted to perform the control. Moreover, the regenerating side fan 1 need not necessarily be disposed after the outside air processing desiccant rotor 3 (on the regenerating side air exit side), but rather may be provided, for example, in the flow path for the air on the regenerating side between the outside air processing desiccant rotor 3 and the supply air processing desiccant rotor 4, or prior to the supply air processing desiccant rotor 4 (the regenerating side air entrance side).

Additionally, in examples set forth above in FIG. 1 and FIG. 13, only the outside air OA was supplied to the rotary moisture removing device 100A as air on the processing side; however, instead return air from the dry area 200 may be added to the air on the processing side for the rotary moisture removing device 100A.

Moreover, while in the examples set forth above the heating device for heating the air on the regenerating side was a hot water coil and the cooling device for cooling the air on the processing side was a cold water coil, the heating device and cooling device are not limited to a hot water coil and a cold water coil.

Moreover, while in the examples, set forth above, the desiccant air conditioners 100 were of types that are provided with air temperature adjusting devices 100B, they may instead be types that are not provided with the air temperature adjusting device 100B. That is, they may be desiccant air conditioners (outside conditioning device) of a type that sends, to the dry area 200, supply air SA from which moisture has been removed by the rotary moisture removing device 100A but for which the temperature has not been adjusted.

Moreover, while in the examples set forth above, that which was controlled was the speed of rotation of the regenerating side fan 1 (the regenerating air flow rate), instead the speeds of rotation of the desiccant rotors 3 and 4 may be that which is controlled, or the exit temperatures of the air that is heated by the hot water coils 7 and 8 may be that which is controlled.

Additionally, while in the example, set forth above, specific numeric values were given in the explanation such as the "0.5° C. DP≥Δtd?" in Step S109 (FIG. 2), these quantitative values are quantitative values that are given as examples, and, of course, the suitable and appropriate values may be set.

The desiccant air conditioning system and operating method thereof according to the present invention can be used for air conditioning, by which to maintain low humidity, in a variety of fields, such as lithium battery factories, food processing factories, and distribution warehouses.

The invention claimed is:

1. A desiccant air-conditioning system comprising a regenerating side fan for forming a regenerating side air flow, a processing side fan for forming a processing side air flow,
   a first desiccant rotor that is disposed bridging a downstream side of a regenerating side air flow path and an upstream side of a processing side air flow path, for continuously adsorbing moisture from the processing side and desorbing moisture to the regenerating side while rotating, a second desiccant rotor that is disposed bridging an upstream side of a regenerating side air flow path and a downstream side of a processing side air flow path, for continuously adsorbing moisture from the processing side and desorbing moisture to the regenerating side while rotating, a first pre-cooling device for cooling air on the processing side prior to adsorption of moisture by the first desiccant rotor, a second pre-cooling device for cooling air on the processing side prior to adsorption of moisture by the second desiccant rotor, a first heating device for heating air on the regenerating side prior to desorption of moisture by the first desiccant rotor, a second heating device for heating air on the regenerating side prior to desorption of moisture by the second desiccant rotor, and an air-conditioned space for receiving supply of air that has been dried of the processing side, for which moisture has been absorbed by the second desiccant rotor, comprising:
   a water content amount detector detecting the water content amount at a specific location that has been determined in a flow path where in dried air flows on the processing side;
   a control value determining device determining the flow rate of air on the regenerating side, the speed of rotation of the desiccant rotors, and/or the exit temperature of the air heated by the heating devices, as that which is controlled, and for determining a control value for that which is controlled to cause the water content amount, detected by the water content amount detecting means, to go to a target water content amount; and
   a second pre-cooling device exit temperature setting device determining a setting value for the exit temperature of the air that is cooled by the second pre-cooling device in accordance with the control value determined by the control value determining device.

2. The desiccant air-conditioning system as set forth in claim 1, wherein:
   the second pre-cooling device exit temperature setting device:
      increases the setting value for the exit temperature of the air that is cooled by the second pre-cooling device in accordance with the control value if the control value is a control value in the direction of increasing the water content amount, detected by the water content amount detector, to a target water content amount.

3. A desiccant air-conditioning system operating method that is applied to a desiccant air-conditioning system that comprises a regenerating side fan for forming a regenerating side air flow, a processing side fan for forming a processing side air flow, a first desiccant rotor that is disposed bridging a downstream side of a regenerating side air flow path and an upstream side of a processing side air flow path, for continuously adsorbing moisture from the processing side and desorbing moisture to the regenerating side while rotating, a second desiccant rotor that is disposed bridging an upstream side of a regenerating side air flow path and a downstream side of a processing side air flow path, for continuously adsorbing moisture from the processing side and desorbing moisture to the regenerating side while rotating, a first pre-cooling device for cooling air on the processing side prior to adsorption of moisture by the first desiccant rotor, a second pre-cooling device for cooling air on the processing side prior to adsorption of moisture by the second desiccant rotor, a first heating device for heating air on the regenerating side prior to desorption of moisture by the first desiccant rotor, a second heating device for heating air on the regenerating side prior to desorption of moisture by the second desiccant rotor, and an air-conditioned space for receiving supply of air that has been dried of the processing side, for which moisture has been absorbed by the second desiccant rotor, comprising the steps of:
   a water content amount detecting step detecting the water content amount at a specific location that has been determined in a flow path where in dried air flows on the processing side;
   a control value determining step determining the flow rate of air on the regenerating side, the speed of rotation of the desiccant rotors, and/or the exit temperature of the air heated by the heating devices, as that which is controlled, and for determining a control value for that which is controlled to cause the water content amount, detected by the water content amount detecting step, to go to a target water content amount; and
   a second pre-cooling device exit temperature setting step determining a setting value for the exit temperature of the air that is cooled by the second pre-cooling device in accordance with the control value determined by the control value determining step.

4. The desiccant air-conditioning operating method as set forth in claim 3, wherein:
   the second pre-cooling device exit temperature setting step further comprises the step of:
      increasing the setting value for the exit temperature of the air that is cooled by the second pre-cooling device in accordance with the control value if the control value is a control value in the direction of increasing the water content amount, detected by the water content amount detecting means, to a target water content amount.

* * * * *